(12) United States Patent
Park et al.

(10) Patent No.: US 12,384,389 B2
(45) Date of Patent: Aug. 12, 2025

(54) VEHICLE, AND CONTROL METHOD FOR DETERMINING A FAILURE IN A VEHICLE POWER CIRCUIT

(71) Applicants: HYUNDAI MOTOR COMPANY, Seoul (KR); KIA CORPORATION, Seoul (KR)

(72) Inventors: Myoung Soo Park, Yongin-si (KR); Sungtae Kim, Yongin-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 240 days.

(21) Appl. No.: 17/993,481

(22) Filed: Nov. 23, 2022

(65) Prior Publication Data

US 2023/0192106 A1    Jun. 22, 2023

(30) Foreign Application Priority Data

Dec. 20, 2021    (KR) .................. 10-2021-0182464

(51) Int. Cl.
| | |
|---|---|
| *B60W 50/02* | (2012.01) |
| *B60R 16/023* | (2006.01) |
| *B60R 16/03* | (2006.01) |
| *B60W 50/14* | (2020.01) |

(52) U.S. Cl.
CPC ..... *B60W 50/0205* (2013.01); *B60R 16/0231* (2013.01); *B60R 16/03* (2013.01); *B60W 50/14* (2013.01)

(58) Field of Classification Search
None
See application file for complete search history.

(56) References Cited

U.S. PATENT DOCUMENTS

| | | | |
|---|---|---|---|
| 2020/0399856 A1* | 12/2020 | Watanabe | H02J 7/00032 |
| 2021/0178903 A1* | 6/2021 | Jeon | B60L 50/64 |
| 2023/0409704 A1* | 12/2023 | Kim | G06F 21/554 |
| 2024/0149812 A1* | 5/2024 | Ramsauer | B60R 16/023 |

* cited by examiner

*Primary Examiner* — James J Lee
*Assistant Examiner* — Elizabeth Galyn Martinez
(74) *Attorney, Agent, or Firm* — Morgan, Lewis & Bockius LLP

(57) ABSTRACT

A vehicle and a control method thereof capable of easily detecting a failure of a power circuit of a vehicle and safely controlling the vehicle depending on a failure detection result, includes dividing power loads of a vehicle into a plurality of zones and obtaining a failure determination criterion value of each of the zones, monitoring a voltage drop in each of the zones, determining whether a power circuit in each of the zones fails based on a difference between the voltage drop in each of the zones and the failure determination criterion value, and performing preset safe driving control of the vehicle depending on a zone determined as the failure among the plurality of zones.

20 Claims, 3 Drawing Sheets

FIG. 2

| MAIN CONTROLLER | | | ZONE A | | | | ZONE B | | | | ZONE C | | | |
|---|---|---|---|---|---|---|---|---|---|---|---|---|---|---|
| Z | Imin | Vmin | Z | Imax | Vmax | | Z | Imax | Vmax | | Z | Imax | Vmax | |
| 10mΩ | 15A | 0.15V | 25mΩ | 100A | 2.5V | | 50mΩ | 80A | 4V | | 35mΩ | 70A | 2.45V | |

210 : NORMAL VOLTAGE DROP

| | ZONE A | ZONE B | ZONE C |
|---|---|---|---|
| MAIN CONTROLLER VOLTAGE DROP | 2.5V − 0.15V = 2.35V | 4V − 0.15V = 3.85V | 2.45V − 0.15V = 2.3V |

250 : FAILURE DETERMINATION CRITERION

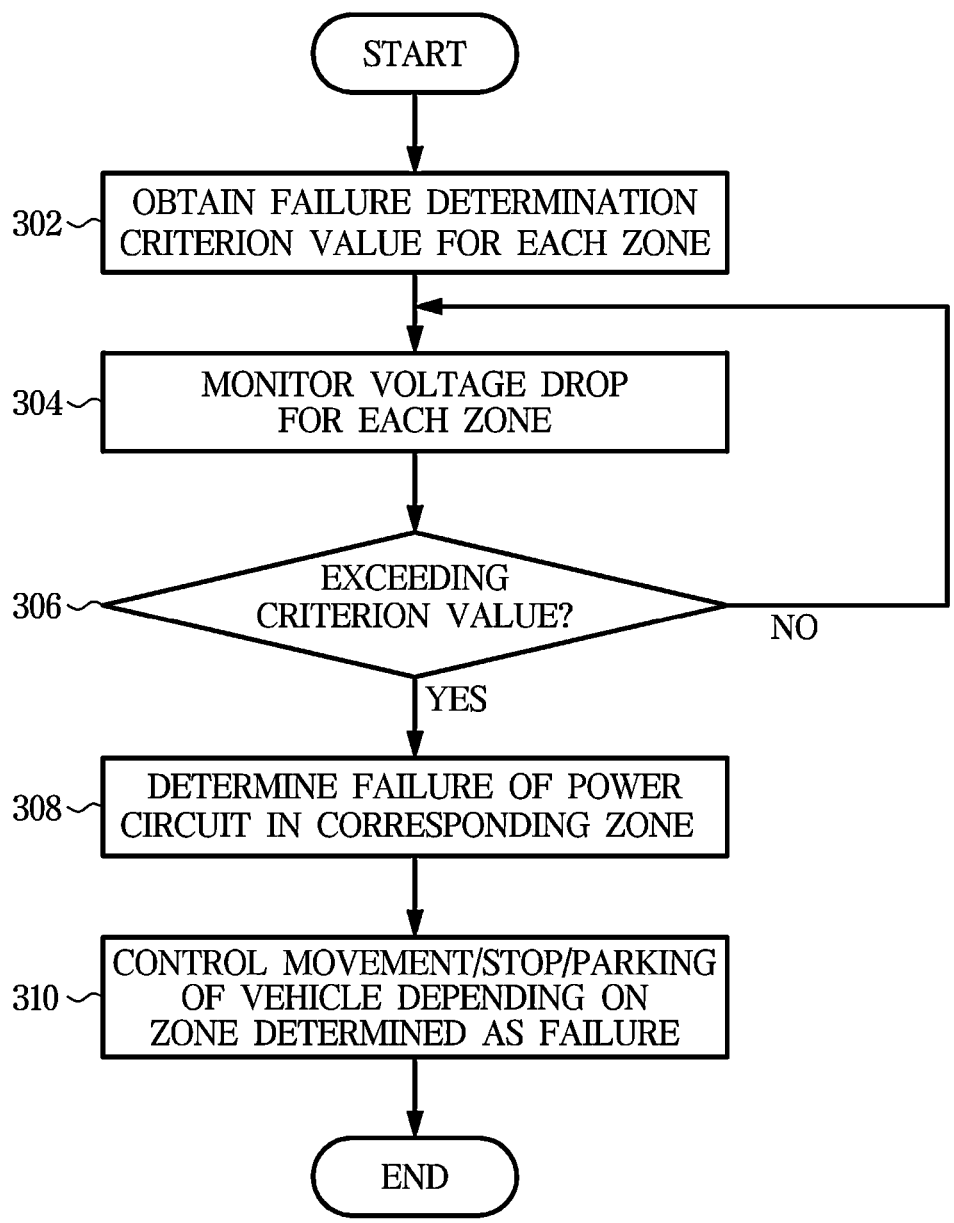

VEHICLE, AND CONTROL METHOD FOR DETERMINING A FAILURE IN A VEHICLE POWER CIRCUIT

CROSS-REFERENCE TO RELATED APPLICATION(S)

The present application claims priority to Korean Patent Application No. 10-2021-0182464, filed on Dec. 20, 2021, the entire contents of which is incorporated herein for all purposes by this reference.

BACKGROUND OF THE PRESENT DISCLOSURE

Field of the Present Disclosure

The present disclosure relates to a vehicle, and more particularly, to a vehicle failure detection and vehicle control therefor.

Description of Related Art

A vehicle is provided with various types of electronic components. These electric components may include components for safety of the vehicle and an occupant and components for convenience of the occupant, as well as components related to driving/braking of the vehicle. These electronic components are power loads that consume power. To the present end, power is supplied through a power line connected from a power source to each electronic component.

Therefore, for the electronic components to operate normally, a sufficient amount of power needs to be supplied. Because when a problem occurs in the power line, sufficient power is not supplied to the electronic components, the electronic components may not operate normally. Furthermore, when the electronic components do not operate normally, abnormal power consumption may occur.

For the safety of the vehicle and occupant, it is very important to accurately determine whether the electronic components and power circuits of the vehicle operate normally and to deal with them.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to easily detect a failure of a power circuit of a vehicle and safely control the vehicle depending on a failure detection result.

Additional aspects of the present disclosure will be set forth in part in the description which follows, and in part, will be obvious from the description, or may be learned by practice of the present disclosure.

In accordance with an aspect of the present disclosure, a vehicle control method includes dividing power loads of a vehicle into a plurality of zones and obtaining a failure determination criterion value of each of the zones, monitoring a voltage drop in each of the zones, determining whether a power circuit in each of the zones fails based on a difference between the voltage drop in each of the zones and the failure determination criterion value, and performing preset safe driving control of the vehicle depending on a zone determined as the failure among the plurality of zones.

Each of the zones may be divided as a target controlled by a same zone controller, sharing the power circuit, and performing an operation related to at least one preset function.

The at least one preset function may include at least one of a function related to driving or braking of the vehicle, a function related to safety of the vehicle, and a function related to convenience of the vehicle.

When the zone determined as the failure is a zone in which an operation related to the function related to the driving or the braking of the vehicle is performed, the vehicle may be parked and a driver may be notified of the failure.

When the zone determined as the failure is a zone in which an operation related to the function related to safety of the vehicle is performed, the vehicle may be stopped and a driver may be notified of the failure.

When the zone determined as the failure is a zone in which an operation related to the function related to the convenience of the vehicle is performed, the vehicle may continue to drive and a driver may be notified that the function related to the convenience is unavailable.

The failure determination criterion value may be a difference between a maximum voltage drop in a normal state of the power circuit in each of the zones and a minimum voltage drop in a normal state of a power source supplying power to each of the zones.

When a difference between an actual maximum voltage drop in the power circuit in each of the zones and an actual minimum voltage drop on the power source supplying power to each of the zones does not match the failure determination criterion value, it may be determined that a failure has occurred in the power circuit in the corresponding zone.

In accordance with an aspect of the present disclosure, a vehicle includes a plurality of zone controllers provided in a plurality of zones, respectively, to divide power loads of the vehicle for each of the zones, a power source provided to supply power to each of the zones, and a main controller provided on a power supply side to communicate with the plurality of zone controllers, wherein the main controller is configured to obtain a failure determination criterion value of each of the zones, monitor a voltage drop in each of the zones by communicating with the plurality of zone controllers, determine whether a power circuit in each of the zones fails based on a difference between the voltage drop in each of the zones and the failure determination criterion value, and perform preset safe driving control of the vehicle in accordance with a zone determined as the failure among the plurality of zones.

Each of the zones may be divided as a target controlled by a same zone controller, sharing the power circuit, and performing an operation related to at least one preset function.

The at least one preset function may include at least one of a function related to driving or braking of the vehicle, a function related to safety of the vehicle, and a function related to convenience of the vehicle.

When the zone determined as the failure is a zone in which an operation related to the function related to the driving or the braking of the vehicle is performed, the vehicle may be parked and a driver may be notified of the failure.

When the zone determined as the failure is a zone in which an operation related to the function related to safety of the vehicle is performed, the vehicle may be stopped and a driver may be notified of the failure.

When the zone determined as the failure is a zone in which an operation related to the function related to the convenience of the vehicle is performed, the vehicle may continue to drive and a driver may be notified that the function related to the convenience is unavailable.

The failure determination criterion value may be a difference between a maximum voltage drop in a normal state of the power circuit in each of the zones and a minimum voltage drop in a normal state of a power source supplying power to each of the zones.

When a difference between an actual maximum voltage drop in the power circuit in each of the zones and an actual minimum voltage drop on the power source supplying power to each of the zones does not match the failure determination criterion value, it may be determined that a failure has occurred in the power circuit in the corresponding zone.

In accordance with an aspect of the present disclosure, a vehicle control method includes dividing power loads of a vehicle into a plurality of zones and obtaining a failure determination criterion value of each of the zones, monitoring a voltage drop in each of the zones, and determining whether a power circuit in each of the zones fails based on a difference between the voltage drop in each of the zones and the failure determination criterion value.

In accordance with an aspect of the present disclosure, a vehicle includes a plurality of zone controllers provided in a plurality of zones, respectively, to divide power loads of the vehicle for each of the zones, a power source provided to supply power to each of the zones, and a main controller provided on a power supply side to communicate with the plurality of zone controllers, wherein the main controller is configured to obtain a failure determination criterion value of each of the zones, monitor a voltage drop in each of the zones by communicating with the plurality of zone controllers, and determine whether a power circuit in each of the zones fails based on a difference between the voltage drop in each of the zones and the failure determination criterion value.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 2 is a table illustrating power characteristics for each zone of the vehicle according to an exemplary embodiment of the present disclosure; and FIG. 3 is a flowchart illustrating a vehicle control method according to an exemplary embodiment of the present disclosure.

Figure 1:
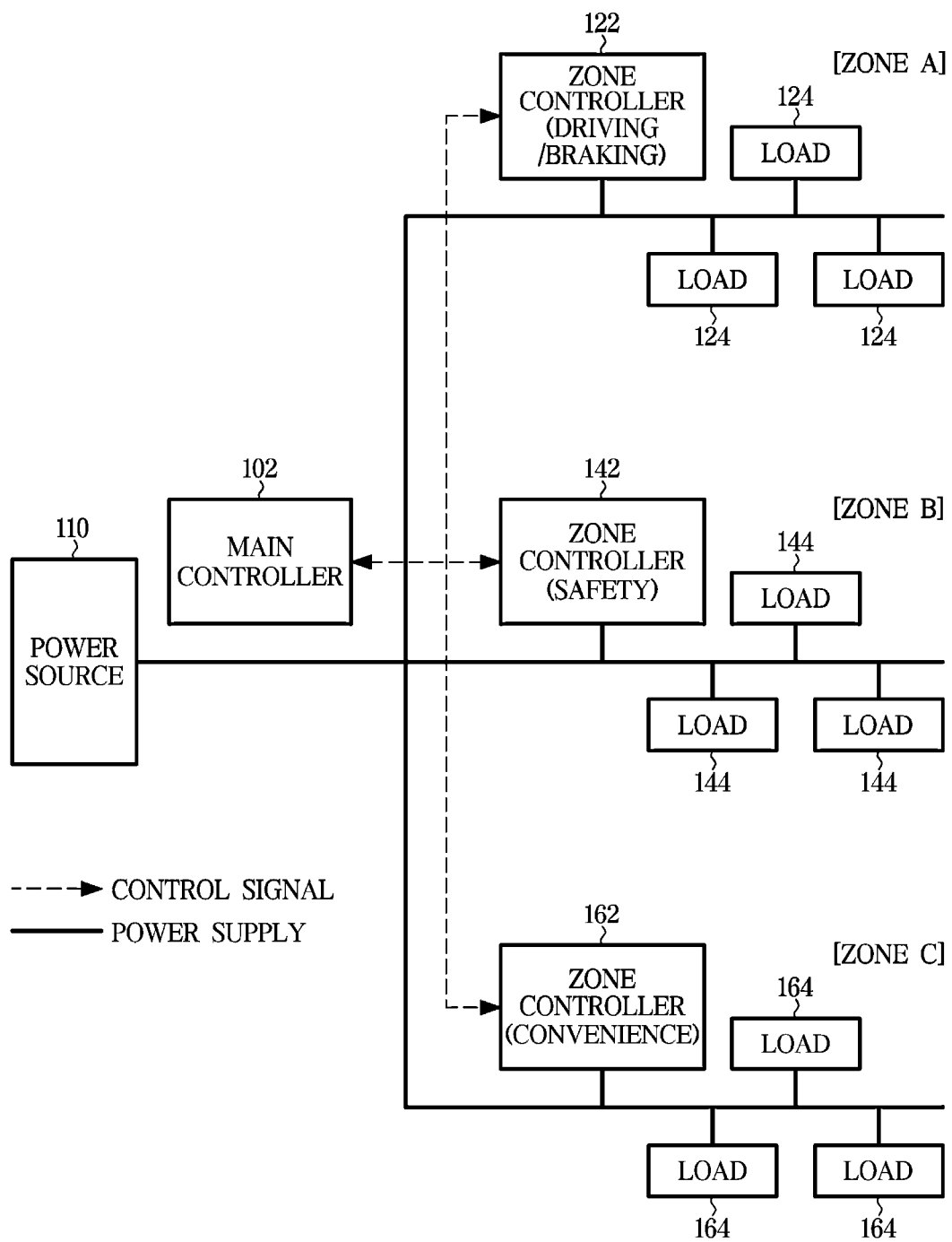
FIG. 1 is a diagram illustrating a power control system of a vehicle according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to a same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

FIG. 1 is a diagram illustrating a power control system of a vehicle according to an exemplary embodiment of the present disclosure.

In FIG. 1, loads 124, 144, and 164 are power loads (electronic components) mounted on a vehicle and consuming power. These loads may be divided into different zones depending on provided functions (roles). Herein, the 'zone' may be defined as a target which is controlled by same zone controllers 122, 142 and 162, shares a power circuit, and performs an operation related to at least one preset function (operation).

For example, as illustrated in FIG. 1, the load 124 in zone A, which is an electronic component related to driving/braking of a vehicle, is controlled by the zone controller 122 provided to control the driving/braking of the vehicle. The zone controller 122 also monitors a situation of power supply to the load 124 in zone A. For example, when a voltage drop occurs in the power circuit supplying power to the load 124 in zone A, the zone controller 122 monitors a magnitude of the voltage drop. A monitoring result of the zone controller 122 is transmitted to a main controller 102. The monitoring result is, for example, a voltage drop occurring in the power circuit in zone A.

As illustrated in FIG. 1, the load 144 in zone B, which is an electronic component related to vehicle safety, is controlled by the zone controller 142 in charge of controlling for safe driving of the vehicle. The zone controller 142 also monitors a situation of power supply to the load 144 in zone B. For example, when a voltage drop occurs in the power circuit supplying power to the load 144 in zone B, the zone controller 142 monitors a magnitude of the voltage drop. A monitoring result of the zone controller 142 is transmitted to the main controller 102. The monitoring result is, for example, a voltage drop occurring in the power circuit in zone B.

As illustrated in FIG. 1, the load 164 in zone C, which is an electronic component related to convenience of the vehicle, is controlled by the zone controller 162 in charge of controlling for providing convenience to a driver and occupant of the vehicle. The zone controller 162 also monitors a situation of power supply to the load 164 in zone C. For example, when a voltage drop occurs in the power circuit supplying power to the load 164 in zone C, the zone controller 162 monitors a magnitude of the voltage drop. A monitoring result of the zone controller 162 is transmitted to the main controller 102. The monitoring result is, for example, a voltage drop occurring in the power circuit in zone C.

Power to be supplied to the main controller 102, and the loads 124, 144, and 164 and the zone controllers 122, 142, and 162 in zones A, B, and C, respectively, is provided from a power source 110.

The main controller 102 monitors the situation of the power supply to the loads 124, 144, and 164 and the zone controllers 122, 142, and 162 in zones A, B, and C, respectively, and when a problem occurs in power supply, performs controlling of movement/stop/parking of the vehicle depending on the zone in which the problem occurs. This will be described later in more detail with reference to FIG. 2 and FIG. 3.

FIG. 2 is a table illustrating power characteristics for each zone of the vehicle according to an exemplary embodiment of the present disclosure. In FIG. 2, reference numeral 210 denotes a normal voltage drop in the main controller 102 and each zone. Furthermore, in FIG. 2, reference numeral 250 denotes a failure determination criterion for each zone.

As illustrated by reference numeral 210 in FIG. 2, during normal operation of the main controller 102, a minimum current Imin of 15 A and a minimum voltage drop Vmin of 0.15V occur at an impedance Z of 10 mΩ During normal operation of the zone controller 122 and the load 124 in zone A, a maximum current Imax of 100 A and a maximum voltage drop Vmax of 2.5V occur at the impedance Z of 25 mΩ in the power circuit in zone A. During normal operation of the zone controller 142 and the load 144 in zone B, the maximum current Imax of 80 A and the maximum voltage drop Vmax of 4V occur at the impedance Z of 50 mΩ in the power circuit in zone B. During normal operation of the zone controller 162 and load 164 in zone C, the maximum current Imax of 70 A and the maximum voltage drop Vmax of 2.45V occur at the impedance Z of 35 mΩ in the power circuit in zone C. The impedance Z, the minimum current Imin, the maximum current Imax, the minimum voltage drop Vmin, and the maximum voltage drop Vmax as described above may vary depending on power consumption characteristics of the main controller 102, the zone controller 122, 142 and 162, and the loads 124, 144 and 164, and an impedance of a wire to transmit power.

Based on the minimum voltage drop Vmin on the main controller 102 side and the maximum voltage drop Vmax for each zone as described above, as illustrated by reference numeral 250 in FIG. 2, the failure determination criterion for each zone may be determined.

Assuming that the minimum voltage drop of 1.5V occurs on the main controller 102 side, in the case of zone A, a difference between the maximum voltage drop of 2.5V in zone A and the minimum voltage drop of 1.5V on the main controller 102 side is 2.35V. That is, in a case where a voltage drop of 2.35V or less occurs in the power circuit in zone A when the minimum voltage drop of 1.5V on the main controller 102 side occurs, it may be determined that the power circuit in zone an operates normally. Conversely, in a case where a voltage drop exceeding 2.35V occurs in the power circuit in zone A when the minimum voltage drop of 1.5V on the main controller 102 side occurs, it may be determined that a problem (failure) has occurred in the power circuit in zone A. In a state where the main controller 102 intentionally controls by requesting the zone controller 122 so that all the loads 124 in zone A consume a maximum rated power, when a voltage drop of less than 2.35V occurs in the power circuit in zone A, it may also be determined that a problem (failure) has occurred in the power circuit in zone A in the instant case as well.

Assuming that the minimum voltage drop of 1.5V occurs on the main controller 102 side, in the case of zone B, a difference between the maximum voltage drop of 4V in zone B and the minimum voltage drop of 1.5V on the main controller 102 side is 3.85V. That is, in a case where a voltage drop of 3.85V or less occurs in the power circuit in zone B when the minimum voltage drop of 1.5V on the main controller 102 side occurs, it may be determined that the power circuit in zone B operates normally. Conversely, in a case where a voltage drop exceeding 3.85V occurs in the power circuit in zone B when the minimum voltage drop of 1.5V on the main controller 102 side occurs, it may be determined that a problem (failure) has occurred in the power circuit in zone B. In a state where the main controller 102 intentionally controls by requesting the zone controller 142 so that all the loads 144 in zone B consume a maximum rated power, when a voltage drop of less than 3.85V occurs in the power circuit in zone B, it may also be determined that a problem (failure) has occurred in the power circuit in zone B in the instant case as well.

Assuming that the minimum voltage drop of 1.5V occurs on the main controller 102 side, in the case of zone C, a difference between the maximum voltage drop of 2.45V in zone C and the minimum voltage drop of 1.5V on the main controller 102 side is 2.3V. That is, in a case where a voltage drop of 2.3V or less occurs in the power circuit in zone C when the minimum voltage drop of 1.5V on the main controller 102 side occurs, it may be determined that the power circuit in zone C operates normally. Conversely, in a case where a voltage drop exceeding 2.3V occurs in the power circuit in zone C when the minimum voltage drop of 1.5V on the main controller 102 side occurs, it may be determined that a problem (failure) has occurred in the power circuit in zone C. In a state where the main controller 102 intentionally controls by requesting the zone controller 162 so that all the loads 164 in zone C consume a maximum rated power, when a voltage drop of less than 2.3V occurs in the power circuit in zone C, it may also be determined that a problem (failure) has occurred in the power circuit in zone C in the instant case as well.

Accordingly, the main controller 102 may determine whether the power circuit for each zone fails based on a difference between the maximum voltage drop Vmax for each zone and the minimum voltage drop Vmin on the main controller 102 side.

FIG. 3 is a flowchart illustrating a vehicle control method according to an exemplary embodiment of the present disclosure. A vehicle control method in FIG. 3 illustrates a method of determining a failure of a power circuit in a vehicle and controlling the movement/stop/parking of the vehicle depending on a determination result.

As illustrated in FIG. 3, the main controller 102 obtains a failure determination criterion value for each zone (302). The failure determination criterion value for each zone is as shown in reference numeral 250 of FIG. 2 described above. That is, the failure determination criterion value for each zone is a value determined based on a difference between the maximum voltage drop Vmax on the main controller 102 side and the minimum voltage drop Vmin for each zone.

The main controller 102 monitors the voltage drop for each zone (304).

The main controller 102 compares the monitored voltage drop for each zone with the voltage drop on the main controller 102 side and checks whether the difference value exceeds the failure determination criterion for each zone shown in reference numeral 250 of FIG. 2 (306).

When the difference between the monitored voltage drop for each zone and the voltage drop on the main controller 102 side exceeds the failure determination criterion for each zone shown in reference numeral 250 of FIG. 2 ('YES' in 306), the main controller 102 determines that a failure has occurred in the power circuit in the corresponding zone (308). That is, when an actual voltage drop for each zone exceeds the failure determination criterion 250 for each zone of FIG. 2, it may be determined that a failure has occurred in the power circuit in the corresponding zone. Or, in a state where the loads 124, 144, and 164 for each zone are set to consume the maximum rated power, when the actual voltage drop for each zone is less than the failure determination criterion 250 for each zone of FIG. 2, it may be determined that a failure has occurred in the power circuit in the corresponding zone.

When there is a failure-determined zone, the main controller 102 controls the movement/stop/parking of the vehicle depending on the power circuit in which zone has the failure (310). In the description of FIG. 1 above, it has been described that the zone may be classified by being divided into zone A in which the load 124 related to the driving/braking of the vehicle is disposed, zone B in which the load 144 related to the safety of the vehicle and occupant is disposed, and zone C in which the load 164 related to the convenience of the occupant is disposed. Therefore, when a failure occurs in the power circuit in zone C in which the load 164 related to the convenience of the occupant is disposed, because the failure does not directly affect the operation or safety of the vehicle, the driver may be notified that convenience devices may not operate normally while the vehicle continues to move. Or, when a failure occurs in the power circuit in zone B in which the load 144 related to the safety of the vehicle and occupant is placed, because the failure directly affects the safety of the vehicle and occupant, the driver may be notified that safety driving assistance devices may not operate normally after the vehicle is stopped in a safe place. Or, when a failure occurs in the power circuit in zone A in which the load 124 related to the driving/braking of the vehicle is disposed, because the normal operation of the vehicle itself is difficult due to the failure, the driver may be notified that the vehicle may not be operated after the vehicle is parked in a safe place and an engine is turned off.

When there is no zone in which a failure is determined to have occurred ('NO' in 306), the main controller 102 returns to step 304 and continues to monitor the voltage drop for each zone (304).

As is apparent from the above, according to the present disclosure, a failure of a power circuit of a vehicle may be easily detected, and the vehicle may be safely controlled depending on a failure detection result.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle control method comprising:
obtaining a failure determination criterion value of each of a plurality of zones set by at least one preset function of power loads of a vehicle;
monitoring a voltage drop in each of the zones;
determining whether a power circuit in each of the zones fails based on a difference between the voltage drop in each of the zones and the failure determination criterion value; and
performing preset safe driving control of the vehicle in accordance with a zone determined as a failure among the plurality of zones,
wherein the determining whether the power circuit in each of the zones fails includes:
determining a difference between an actual maximum voltage drop in the power circuit in each of the zones and an actual minimum voltage drop on a power source supplying power to each of the zones; and
determining whether the difference between the actual maximum voltage drop in the power circuit in each of the zones and the actual minimum voltage drop on the power source supplying power to each of the zones is the same as the failure determination criterion value.

2. The vehicle control method of claim 1, wherein each of the zones is set as a target controlled by a same zone controller, sharing the power circuit, and performing an operation related to the at least one preset function.

3. The vehicle control method of claim 2, wherein the at least one preset function includes at least one of a function related to driving or braking of the vehicle, a function related to safety of the vehicle, and a function related to convenience of the vehicle.

4. The vehicle control method of claim 3, wherein when the zone determined as the failure is a zone in which an operation related to the function related to the driving or the braking of the vehicle is performed, the vehicle is parked and a driver is notified of the failure.

5. The vehicle control method of claim 3, wherein when the zone determined as the failure is a zone in which an operation related to the function related to the safety of the vehicle is performed, the vehicle is stopped and a driver is notified of the failure.

6. The vehicle control method of claim 3, wherein when the zone determined as the failure is a zone in which an operation related to the function related to the convenience of the vehicle is performed, the vehicle continues to drive and a driver is notified that the function related to the convenience is unavailable.

7. The vehicle control method of claim 1, wherein the failure determination criterion value is a difference between a maximum voltage drop in a normal state of the power circuit in each of the zones and a minimum voltage drop in a normal state of the power source supplying power to each of the zones.

8. The vehicle control method of claim 7, wherein when the difference between the actual maximum voltage drop in the power circuit in each of the zones and the actual minimum voltage drop on the power source supplying power to each of the zones does not match the failure determination criterion value, it is determined that a failure has occurred in the power circuit in a corresponding zone.

9. A vehicle comprising:
a plurality of zone controllers provided in a plurality of zones set by at least one preset function of power loads of the vehicle;
a power source provided to supply power to each of the zones; and
a main controller provided on a power supply side to communicate with the plurality of zone controllers,
wherein the main controller is configured to obtain a failure determination criterion value of each of the zones, monitor a voltage drop in each of the zones by communicating with the plurality of zone controllers, determine whether a power circuit in each of the zones fails based on a difference between the voltage drop in each of the zones and the failure determination criterion value, and perform preset safe driving control of the vehicle depending on a zone determined as a failure among the plurality of zones, and
wherein the main controller is configured to:
determine a difference between an actual maximum voltage drop in the power circuit in each of the zones and an actual minimum voltage drop on a power source supplying power to each of the zones; and
determine whether the difference between the actual maximum voltage drop in the power circuit in each of the zones and the actual minimum voltage drop on the power source supplying power to each of the zones is the same as the failure determination criterion value.

10. The vehicle of claim 9, wherein each of the zones is set as a target controlled by a same zone controller, sharing the power circuit, and performing an operation related to the at least one preset function.

11. The vehicle of claim 10, wherein the at least one preset function includes at least one of a function related to driving or braking of the vehicle, a function related to safety of the vehicle, and a function related to convenience of the vehicle.

12. The vehicle of claim 11, wherein when the zone determined as the failure is a zone in which an operation related to the function related to the driving or the braking of the vehicle is performed, the vehicle is parked and a driver is notified of the failure.

13. The vehicle of claim 11, wherein when the zone determined as the failure is a zone in which an operation related to the function related to the safety of the vehicle is performed, the vehicle is stopped and a driver is notified of the failure by the main controller.

14. The vehicle of claim 11, wherein when the zone determined as the failure is a zone in which an operation related to the function related to the convenience of the vehicle is performed, the vehicle continues to drive and a driver is notified by the main controller that the function related to the convenience is unavailable.

15. The vehicle of claim 9, wherein the failure determination criterion value is a difference between a maximum voltage drop in a normal state of the power circuit in each of the zones and a minimum voltage drop in a normal state of the power source supplying power to each of the zones.

16. The vehicle of claim 15, wherein when the difference between the actual maximum voltage drop in the power circuit in each of the zones and the actual minimum voltage drop on the power source supplying power to each of the zones does not match the failure determination criterion value, the main controller concludes that a failure has occurred in the power circuit in a corresponding zone.

17. A vehicle control method comprising:
obtaining a failure determination criterion value of each of a plurality of zones set by at least one preset function of power loads of a vehicle;
monitoring, by a controller, a voltage drop in each of the zones; and
determining, by the controller, whether a power circuit in each of the zones fails based on a difference between the voltage drop in each of the zones and the failure determination criterion value,
wherein the determining whether the power circuit in each of the zones fails includes:
determining a difference between an actual maximum voltage drop in the power circuit in each of the zones and an actual minimum voltage drop on a power source supplying power to each of the zones;
determining whether the difference between the actual maximum voltage drop in the power circuit in each of the zones and the actual minimum voltage drop on the power source supplying power to each of the zones is the same as the failure determination criterion value; and
performing preset driving control of the vehicle in accordance with a zone determined as a failure among the plurality of zones.

18. The vehicle control method of claim 17,
wherein when a zone determined as a first failure among the plurality of zones is a zone in which an operation related to a function related to driving or braking of the vehicle is performed, the vehicle is parked and a driver is notified of the first failure,
wherein when a zone determined as a second failure among the plurality of zones is a zone in which an operation related to a function related to safety of the vehicle is performed, the vehicle is stopped and the driver is notified of the second failure, and
wherein when a zone determined as a third failure is a zone in which an operation related to a function related to convenience of the vehicle is performed, the vehicle continues to drive and the driver is notified that the function related to the convenience is unavailable.

19. A vehicle comprising:
a plurality of zone controllers provided in a plurality of zones set by at least one preset function of power loads of the vehicle;
a power source provided to supply power to each of the zones; and
a main controller provided on a power supply side to communicate with the plurality of zone controllers,
wherein the main controller is provided to obtain a failure determination criterion value of each of the zones, monitor a voltage drop in each of the zones by communicating with the plurality of zone controllers, and determine whether a power circuit in each of the zones fails based on a difference between the voltage drop in each of the zones and the failure determination criterion value,
wherein the main controller is configured to:
determine a difference between an actual maximum voltage drop in the power circuit in each of the zones and an actual minimum voltage drop on a power source supplying power to each of the zones;
determine whether the difference between the actual maximum voltage drop in the power circuit in each of the zones and the actual minimum voltage drop on the power source supplying power to each of the zones is the same as the failure determination criterion value; and
performing preset driving control of the vehicle in accordance with a zone determined as a failure among the plurality of zones.

20. The vehicle of claim 19,
wherein when a zone determined as a first failure among the plurality of zones is a zone in which an operation related to a function related to driving or braking of the vehicle is performed, the vehicle is parked and a driver is notified of the first failure,
wherein when a zone determined as a second failure among the plurality of zones is a zone in which an operation related to a function related to safety of the vehicle is performed, the vehicle is stopped and the driver is notified of the second failure, and
wherein when a zone determined as a third failure is a zone in which an operation related to a function related to convenience of the vehicle is performed, the vehicle continues to drive and the driver is notified that the function related to the convenience is unavailable.

* * * * *